June 19, 1962  H. A. DE CENZO  3,039,794
QUICK DISCONNECT COUPLING FOR HIGH PRESSURE FLUIDS
Filed July 14, 1958  3 Sheets-Sheet 1
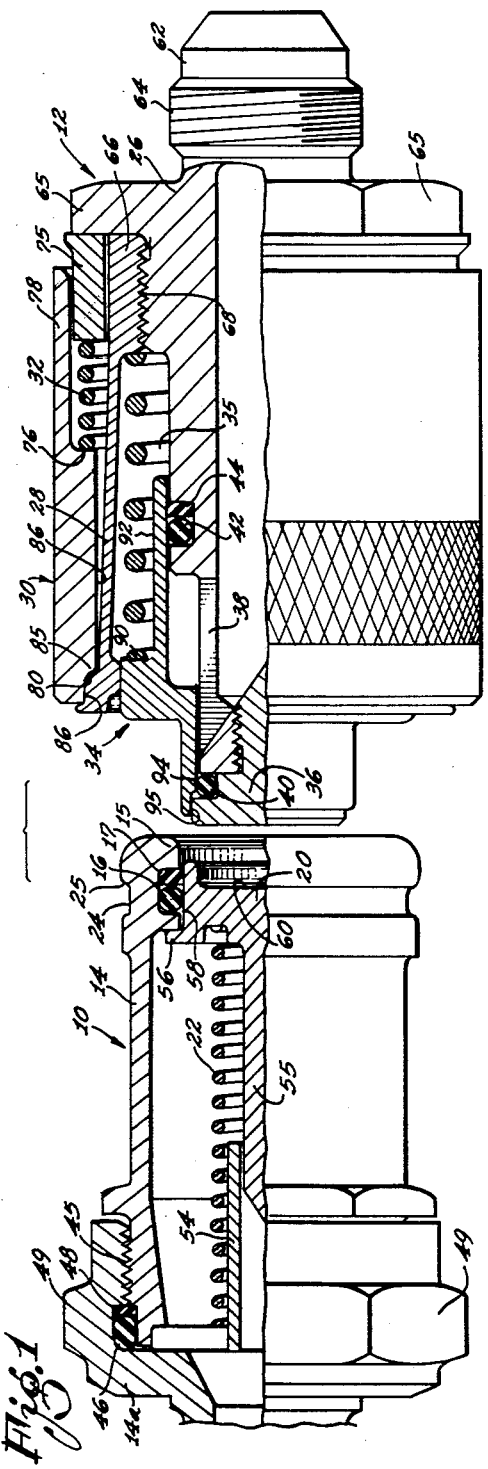
INVENTOR:
Herbert A. DeCenzo
Attorneys

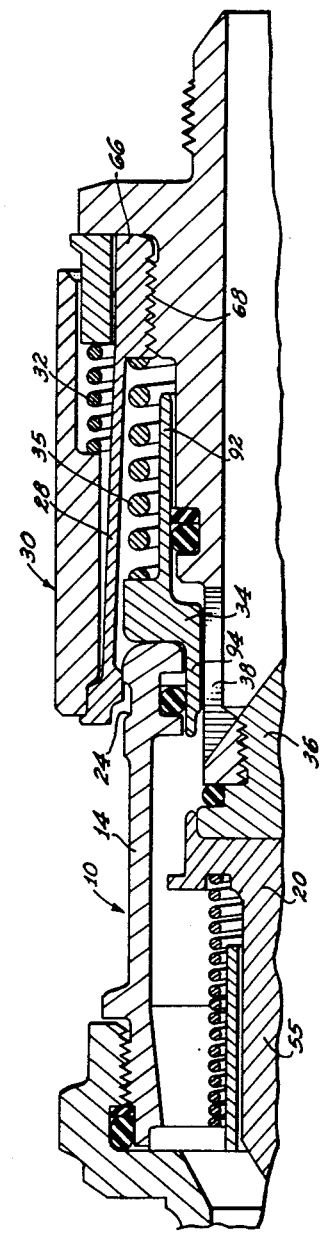
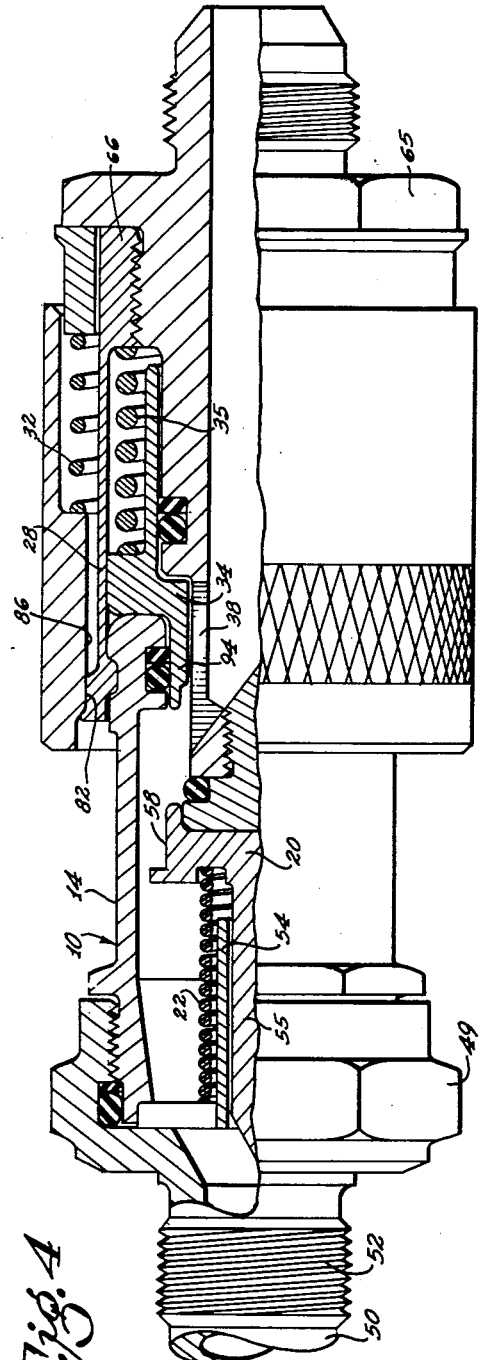

June 19, 1962 H. A. DE CENZO 3,039,794
QUICK DISCONNECT COUPLING FOR HIGH PRESSURE FLUIDS
Filed July 14, 1958 3 Sheets-Sheet 3

INVENTOR:
Herbert A. DeCenzo

Attorneys

United States Patent Office 3,039,794
Patented June 19, 1962

3,039,794
QUICK DISCONNECT COUPLING FOR HIGH PRESSURE FLUIDS
Herbert A. De Cenzo, Arcadia, Calif., assignor to On Mark Couplings, Inc., Los Angeles, Calif., a corporation of California
Filed July 14, 1958, Ser. No. 748,226
2 Claims. (Cl. 284—19)

This invention relates to a quick disconnect coupling for a high pressure fluid line, such as a conduit for gaseous or liquid fluid under surging pressure ranging upward from 3000 p.s.i. The general problem to which the invention is directed is to provide such a quickly releasable coupling for high pressure service that is strong, durable, and operates easily with a smooth disconnecting action.

Strength for the coupling joint is achieved by providing high strength collet-type fingers on one of the two coupling members to engage a circumferential shoulder of the other coupling member, the engagement extending all around the circumference, and by further providing a locking sleeve on the same coupling member to confine and lock the collet fingers in engagement with the locking shoulder.

Durability, as well as strength, is favored by avoiding pivoted collet fingers, since both wear and stress are concentrated at pivots. Durability further requires avoidance of high magnitude concentrated compressive stresses such as occur when hardened locking balls make point contact with cooperating locking shoulders with damaging "Brinell" effect. A further requirement for durability as well as for strength is to minimize the stresses in flexure incurred in the mechanical operation of the working parts of the coupling, since such stresses reduce the capacity of the material of the coupling to meet the high magnitude working stresses caused by the exceedingly high pressure of the confined fluid.

The invention avoids pivots for the collet fingers by making the fingers integral with a collet sleeve for simple flexure of the fingers in engaging and releasing the cooperating locking shoulder. Concentrated compressive stresses are avoided by giving the locking portions of the collet fingers configurations to mate surface-to-surface with the cooperating circumferential locking shoulder with the mating surfaces nearly continuous around the circumference of the locking shoulder.

Minimizing of flexure of the resilient collet fingers is achieved by forming the circumferential series of collet fingers with an unstressed diameter that is intermediate the minimum diameter of the series of fingers for snug engagement with the cooperating circumferential locking shoulder and the maximum diameter required to clear the shoulder. Thus, the resilient fingers must be flexed inward from their unstressed positions for snug engagement with the circumferential locking shoulder and must be flexed outward from their unstressed positions to clear the locking shoulder. This arrangement results in the minimum possible flexure of the collet fingers.

Ease of operation, and especially ease and smoothness of the disconnecting operation, are accomplished largely by biasing the resilient collet fingers to their intermediate configurations in the manner described above. An important feature of the invention, however, is the further concept of making the engagement surfaces of the fingers and/or the engagement surface of the cooperating circumferential locking shoulder suitably sloping to favor the disengagement of the fingers by cam action in response to axial force in the direction to separate the two coupling members. In the preferred practice of the invention, the engagement surfaces of both the fingers and the locking shoulder are sloped for this purpose.

The various features and advantages of the invention will be apparent from the following detailed description together with the accompanying drawings.

In the drawings, which are to be regarded as merely illustrative:

FIG. 1 is a view, partly in side elevation and partly in longitudinal section, showing the two coupling members slightly spaced from each other in positions for movement into mutual interlocking engagement;

FIG. 2 is a fragmentary longitudinal sectional view showing the two coupling members positioned at an intermediate point in their movement into mutual interlocking engagement;

FIG. 3 is a similar longitudinal sectional view showing the two coupling members at a more advanced point in their movement into mutual interlocking engagement;

FIG. 4 is a view, partly in side elevation and partly in longitudinal section, showing the two coupling members completely interlocked with each other;

Figure 6:
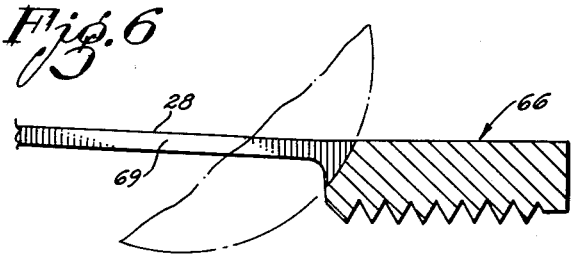
Figure 7:
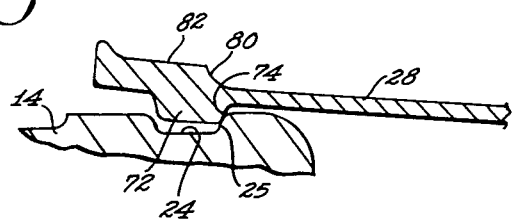

FIG. 6 is a fragmentary sectional view indicating how the collet sleeve is slotted to form the collet fingers; and FIG. 7 is a fragmentary sectional view showing the unstressed configuration of a collet finger in relation to the cooperating circumferential locking shoulder. This view also shows how the engagement surfaces of the collet fingers and the locking shoulder are both sloped in the preferred practice of the invention to favor the disengagement of the collet fingers from the shoulder in the operation of disconnecting the two coupling members.

General Arrangement

The coupling member of the invention comprises two complementary cooperating coupling members or bodies which telescope together in releasable interlocking engagement. For convenience, the female coupling body may be called the adapter and the male coupling body may be called the socket. The socket and the adapter may be used to interconnect various passage structures.

In the initial embodiment of the invention, it is intended that the adapter be incorporated in the construction of an aerial vehicle such as an airplane or self-propelled missile and that the socket will be mounted on the end of a flexible hose to cooperate with the adapter for the transmission of fluid to the aerial vehicle. FIG. 1 shows an adapter, generally designated by the numeral 10, that may be mounted on an aerial vehicle for this purpose and shows a complementary socket, generally designated 12, for mounting on the end of the flexible hose.

The adapter 10 has a tubular body 14 with a radially inwardly extending rim portion 15 which carries circumferential sealing means in a form of a pair of rings 16 and 17. When the socket 12 is disconnected from the adapter, the outer end of the adapter body 14 is closed in a fluidtight manner by a poppet valve member 20 which cooperates with the two sealing rings 16 and 17 and is held in its forward closed position by a suitable spring 22.

The adapter body 14 is formed with a suitable rearwardly directed circumferential shoulder for service in locking the adapter and socket together. In this instance, the leading end of the adapter body 14 is shaped with an outer circumferential groove 24 which provides a rearwardly facing circumferential locking shoulder 25.

The socket 12 comprises: a tubular adapter body 26; a circumferential series of collet-type locking fingers 28 flexibly mounted thereon; an outer retractable locking sleeve 30 to lock the collet fingers in engagement with the previously mentioned locking shoulder 25; an outer coil spring 32 urging the locking sleeve to its forward effective position; an inner annular member 34 which may be termed an ejector; and an inner coil spring 35 which urges the ejector 34 towards a forward position. The socket body 26 is formed with a solid nose 36 which functions as a forward end wall and the adapter body is further formed with a circumferential series of radial ports 38 rearwardly of the nose.

The ejector 34 has multiple functions. One of these functions is to thrust against the adapter 10 under pressure from the spring 35 thereby to tend to separate the socket from the adapter in the course of the uncoupling operation. Another of these functions is to serve as a slide valve to close the radial ports 38 when the two coupling bodies are disconnected. For this purpose, the socket body 26 is provided with a forward sealing ring 40 for sealing contact with the forward portion of the ejector 34, and is further provided with a rearward pair of sealing rings 42 and 44 for cooperation with the rearward portion of the ejector. Another function of the ejector 34 is to expand the series of collet fingers 28 when the ejector is at its forward position shown in FIG. 1. When the collet fingers 28 are outwardly flexed in this manner, they block the forward movement of the locking sleeve 30 and thus hold the locking sleeve in its normal retracted position against the opposition of the coil spring 32 as shown in FIG. 1.

FIG. 1 shows the socket 12 positioned in axial alignment with the adapter 10 in preparation for moving the socket into locked engagement with the adapter. The initial movement of the socket 12 causes the forward end of the ejector 34 and the nose 36 to enter the adapter body 14 as shown in FIG. 2, the leading end of the ejector 34 telescoping into the rim portion 15 of the adapter body 14 and making sealing engagement with the two sealing rings 16 and 17. In this initial movement of the socket, the ejector 34 encounters the poppet valve member 20 and starts the retraction thereof, since the ejector spring 35 is strong enough to overcome the valve spring 22.

With continued advance of the socket 12, the ejector 34 abuts the rim portion 15 of the adapter body 14, and is thereby retracted against the opposition of the ejector spring 35 to open the radial ports 38 as shown in FIG. 3. The nose 36 of the socket, however, continues to telescope into the adapter body 14 and continues to retract the poppet valve body 20 against the opposition of the valve spring 22. In FIG. 3, the collet fingers 28 have almost reached positions for locking the two coupling members together, the collet fingers being poised on the brink of the groove 24.

With the completion of the axial movement of the socket into the adapter, the collet fingers 28 flex inward into the groove 24 to their intermediate unrestrained positions in partial engagement with the annular locking shoulder 25, whereupon the locking sleeve 30 is advanced by the coil spring 32 to its forward position thereby camming the collet fingers inward to lock the collet fingers in their positions of effective engagement with the circumferential locking shoulder 25. The two parts of the coupling are now interlocked as shown in FIG. 4 in a fluidtight manner with the interior of the socket body 26 in communication with the interior of the adapter body 14 through the radial ports 38.

To disconnect the two parts of the coupling, it is necessary merely to retract the locking sleeve 30 manually against the opposition of the spring 32, such retraction tending to pull the socket 12 away from the adapter 10. The retraction of the locking sleeve 30 gives the collet fingers 28 freedom to flex outward to their unrestrained intermediate positions and then with continued withdrawal of the socket, the circumferential locking shoulder 25 cams the collet fingers outward to disconnect the two coupling bodies. Throughout this procedure for disconnecting the two coupling bodies, the ejector exerts helpful thrust against the adapter.

*Details of the Coupling Construction*

The body 14 of the adapter 10 may have a removable section 14a mounted by screw threads 45 with the joint sealed by a pair of sealing rings 46 and 48. The body section 14a may be formed with a hexagonal flange 49 and may be further formed with a nipple portion 50 (FIG. 4) with an external screw thread 52 to permit the socket to be installed for use. The body section 14a is further provided with a cylindrical guide 54 for the previously mentioned spring 22.

The poppet valve member 20 has a guide stem 55 which is slidingly telescoped in the cylindrical guide 54. The head of the poppet valve member 20 has a radial stop flange 56 to abut the rim portion 15 of the adapter body 14 at its closed position and is further formed with a circumferential surface 58 for sealing contact with the two sealing rings 16 and 17. In the preferred practice of the invention, the poppet valve member 20 is further formed with a concentric circular recess 60 on its forward face to mate with the nose 36 of the socket 12.

The socket body 26 is formed with a nipple portion 62 having an external screw thread 64 to permit the socket body to be mounted on the end of a high pressure hose. The socket body 26 is further formed with a hexagonal flange 65 for engagement by a suitable wrench.

Figure 5:
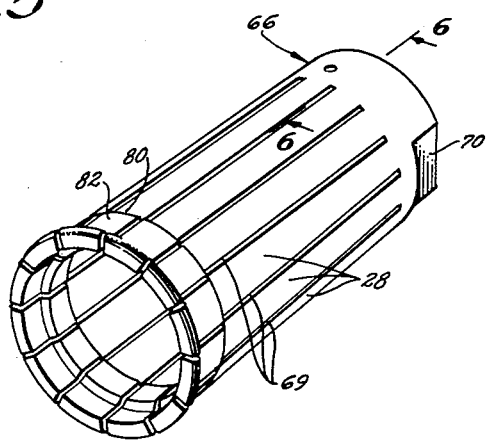
FIG. 5 is a perspective view of the collet sleeve employed in the preferred practice of the invention.

As best shown in FIG. 5, the collet fingers 28 are integral parts of a collet sleeve 66, the fingers being formed by cutting slots 69 in the sleeve. The collet sleeve 66 is mounted on the socket body 26 by mating screw threads 68 (FIG. 1) and is tightened against the hexagonal flange 65. To facilitate assembly of the collet sleeve 66 to the socket body 26, the collet sleeve may be formed with a pair of diametrically opposite flats 70 for engagement by a wrench. As best shown in FIG. 7, each of the collet fingers 28 is formed with a radially inward projection 72 near its outer end, which projection provides a rearwardly facing shoulder 74. The projection 72 is dimensioned to mate with the groove 24 of the adapter body 14 to permit the shoulder 74 of the collect fingers to engage with the circumferential locking shoulder 25 of the adapter. When the series of collet fingers 28 seat in the groove 24 of the socket for locking engagement of the collet finger shoulders 74 with the circumferential locking shoulder 25 of the adapter, the gaps or slots 69 between the successive collet fingers narrow so that the inward projections 72 of the collet fingers form a substantially continuous circumferential shoulder 74 in engagement with the circumferential locking shoulder 25.

As heretofore stated, it is contemplated that both the circumferential locking shoulder 25 of the adapter 10 and the cooperating shoulders 74 of the collet fingers 28 will be slightly inclined or sloped to favor release of the locking fingers by cam action in response to axial force tending to separate the socket 12 from the adapter 10. The desired slope of the shoulders may, for example, be as indicated in FIG. 7. The degree of the slope will depend upon the diameter of the coupling and the contemplated pressure of the fluid that flows through the coupling.

As heretofore stated, the collet fingers 28 preferably are biased to positions that are intermediate, their positions for locking engagement with the circumferential locking shoulder 25 and their positions for clearing the locking shoulder. Thus, the unstressed configuration of each locking finger may be the configuration shown in FIG. 7 in which the inner projection 72 of the finger that mates the groove 24 is lifted approximately half-way out of the groove. To give the fingers 28 used an unstressed configuration, the blank of the sleeve 66 that is slotted to form the fingers is shaped with a slight taper.

The coil spring 32 that acts on the locking sleeve 30 may back against a ring 75 which, in turn, backs against the hexagonal flange 65 of the socket body 26. The locking sleeve 30 is cut away on its inner circumference to provide an inner annular shoulder 76 to seat against the spring 32 and to provide a cylindrical skirt 78 that clears the ring 75.

In the present embodiment of the invention, each of the collet fingers 28 is formed with an outer sloping shoulder 80 (FIG. 7) and a cylindrically curved portion 82 forward from the shoulder 80. The forward end of the locking sleeve 30 is formed with an inner circumferential sloping shoulder 85 (FIG. 1) that normally abuts the sloping shoulders 80 of the collet fingers and is further formed with a forward inner cylindrical surface 86 that normally embraces the cylindrically curved portions 82 of the collet fingers. Thus, when the collet fingers are flexed outward by the ejector 34 at the normal forward position of the ejector, the sloping shoulders 80 of the collet fingers 28 serve as stop means to keep the locking sleeve 30 retracted. Whenever the ejector 34 is retracted sufficiently to permit the series of collet fingers to contract, the force exerted by the spring 32 drives the locking sleeve 30 forward and the sloping inner circumferential shoulder 85 of the locking sleeve acts on the sloping shoulders 80 of the collet fingers to cam the collet fingers inwardly. Finally, the inner cylindrical surface 86 of the main body of the locking sleeve telescopes over the cylindrically curved end portions 82 of the collet fingers as shown in FIG. 4 to lock the collet fingers in their inwardly flexed locking positions.

The ejector 34 has an outside diameter that is substantially the same as the outside diameter of the rim portion 15 of the adapter body 14 so that the collet fingers 28 may slide freely from the ejector onto the rim portion in the operation of locking the two coupling bodies together and may slide freely back from the rim portion to the ejector in the operation of disconnecting the two coupling bodies. The ejector 34 is further formed with a rearwardly facing radial shoulder 90 to seat against the cooperating spring 35 and is formed with a rearwardly extending skirt 92 that cooperates with the previously mentioned sealing rings 42 and 44 at all positions of the ejector. In like manner, the ejector 34 is formed with a forwardly extending cylindrical skirt 94 that normally telescopes over the sealing ring 40 when the two coupling bodies are disengaged as shown in FIG. 1 and telescopes into the previously mentioned sealing rings 16 and 17 of the adapter 10 when the two coupling bodies are locked together as shown in FIG. 4.

A feature of the invention is the concept of employing the pressure of the fluid inside the coupling to cooperate with the spring 35 to urge the ejector towards its forward position when the two coupling bodies are interlocked. For this purpose, the inner diameter of the rearward skirt 92 of the ejector 34 is greater than the outer diameter of the forward skirt 94 to result in the desired forwardly directed pressure differential. Preferably, the forward end of the forward skirt 94 is slightly relieved or chamfered as indicated at 95 (FIG. 1) to facilitate the telescoping movement of the skirt over the sealing ring 40 as the ejector returns to its forward limit position against the nose 36 when the two coupling bodies are initially disconnected.

It is apparent that it is a simple matter to move the socket 12 into interlocking engagement with the adapter member 10. In fact, it is not necessary for the operator to grasp the socket itself, since the leading end of the flexible hose on which the socket is mounted may be grasped for this purpose. As the socket 12 is moved axially towards the adapter 10, the curved forward surface of the rim portion 15 of the adapter body serves as pilot means to guide the nose 36 and the surrounding cylindrical skirt 94 of the ejector 34 into the entrance to the adapter. Since the spring 35 that acts against the ejector 34 is stronger than the spring 22 that acts against the poppet valve member 20, the ejector 34 maintains sealing contact with the sealing ring 40 as the ejector forces the poppet valve member 20 to retreat during the initial movement of the socket as shown in FIG. 2. At the end of this initial movement, the forward shoulder 90 of the ejector 34 makes contact with the rim portion 15 of the socket body 14. Continued axial movement of the socket 12 causes the ejector 34 to retreat, as may be seen by comparing FIGS. 2 and 3, and also carries the inner projections 72 of the collet fingers 28 to the brink of the groove 24 as shown in FIG. 3. Finally, the inner projections 72 of the collet fingers are positioned to drop into the groove 24, whereupon the spring 32 snaps the locking sleeve 30 forward. The tendency of the collet fingers 28 to flex inwardly to their unstressed intermediate configurations shown in FIG. 7 is helpful in carrying out the interlocking engagement of the two coupling bodies, since the cam action provided by the spring-actuated locking sleeve 30 is required merely to flex the collet fingers inward from their intermediate positions.

It is further apparent that the biasing of the collet fingers to their intermediate positions is also helpful in the operation of disengaging the two coupling bodies from each other. Thus, when the locking sleeve 30 is manually retracted from the position shown in FIG. 4, the locking fingers 28 immediately flex outward for partial disengagement from the locking shoulder 25, as shown in FIG. 7, so that the operator needs to exert pulling force of relatively low magnitude to cause the collet fingers to flex outward out of engagement with the locking shoulder 25.

My description in specific detail of the selected embodiments of the invention will suggest various changes, substitutions and other departures from my disclosure within the spirit and scope of the appended claims.

I claim:

1. In a coupling of the character described wherein an end portion of a first coupling body telescopes into an end portion of a second coupling body, the combination of: engagement means on said second body contractible from an expanded release state into engagement with said first body to hold the two bodies together; locking means on said second body movable from a retracted position to a forward locking position to contract and confine said engagement means in engagement with said first body, said engagement means at its expanded state being in the path of forward movement of the locking means; annular resilient sealing means mounted on the inner circumference of the first body; a first valve member in said first body retractable to an open position from a forward closed position in response to the telescoping action of the two bodies, said valve member at its forward closed position being telescoped into said annular sealing means to be sealed thereby; a second valve member in said second body retractable from a forward closed position to a rearward open position by abutment with said first body in the telescoping action of the two bodies, said second valve member having a forwardly extending cylindrical portion dimensioned to telescope into said first body into sealing engagement with said annular sealing means to seal the joint between the two telescoped bodies, said second valve member at its forward closed position holding said engagement means in its expanded state to block forward movement of said locking means, said second valve member at its retracted open position releasing said engagement means for contraction and confinement by said locking means.

2. A combination as set forth in claim 1 in which the rearwardly facing cross-sectional area of said second valve member that is exposed to the fluid in the two telescoped bodies is greater than the forwardly facing cross-sectional area that is exposed to the fluid whereby the second valve member is subjected to a pressure differential to urge it forward towards its closed position.

(References on following page)

References Cited in the file of this patent

UNITED STATES PATENTS

| | | |
|---|---|---|
| 2,327,611 | Scheiwer | Aug. 24, 1943 |
| 2,453,741 | Bopp | Nov. 16, 1948 |
| 2,648,548 | Scheiwer | Aug. 11, 1953 |
| 2,665,928 | Omon et al. | Jan. 12, 1954 |
| 2,727,761 | Elliott et al. | Dec. 20, 1955 |
| 2,823,934 | Gorrell et al. | Feb. 18, 1958 |
| 2,837,352 | Wurzburger | June 3, 1958 |
| 2,905,486 | Goodin, et al. | Sept. 22, 1959 |
| 2,951,713 | Hoffstron | Sept. 6, 1960 |

FOREIGN PATENTS

| | | |
|---|---|---|
| 865,201 | France | Feb. 17, 1941 |